US005254241A

United States Patent [19]

Bange et al.

[11] Patent Number: 5,254,241

[45] Date of Patent: Oct. 19, 1993

[54] LOADING CONTROL SYSTEM FOR A CYCLICAL CENTRIFUGAL MACHINE WHICH ADJUSTS PINCH POSITION

[75] Inventors: Joseph B. Bange, Hamilton; Donald J. Henkel, Loveland, both of Ohio

[73] Assignee: The Western States Machine Company, Hamilton, Ohio

[21] Appl. No.: 928,803

[22] Filed: Aug. 12, 1992

[51] Int. Cl.[5] ...................... B01D 17/12; B01D 17/038

[52] U.S. Cl. ......................................... 210/86; 210/91; 210/97; 210/143; 210/360.1; 494/6

[58] Field of Search ...................... 210/85, 143, 360.1, 210/746, 781, 86, 91, 97, 744; 251/14; 494/5, 43, 6; 91/361, 363 R

[56] References Cited

U.S. PATENT DOCUMENTS

| | | | |
|---|---|---|---|
| 2,337,817 | 12/1943 | Hertrich | 210/360.1 |
| 2,667,974 | 2/1954 | Hertrich | 210/368 |
| 2,727,630 | 2/1955 | Hertrich | 210/360.1 |
| 2,751,083 | 6/1956 | Hertrich | 210/360.1 |
| 2,801,035 | 7/1957 | Hertrich | 222/504 |
| 3,011,641 | 12/1961 | Huser | 210/360.1 |
| 3,079,046 | 2/1963 | Goodwin | 210/360.1 |
| 3,141,846 | 7/1964 | Laven, Jr. | 210/360.1 |
| 4,203,570 | 5/1980 | Hurley et al. | 251/14 |
| 4,229,298 | 10/1980 | Bange | 210/746 |

FOREIGN PATENT DOCUMENTS

| | | | |
|---|---|---|---|
| 979534 | 1/1965 | United Kingdom | 494/6 |

Primary Examiner—Joseph W. Drodge

[57] ABSTRACT

A loading control system for a cyclical centrifugal machine including a rotary centrifugal basket and a loading gate movable between closed and open positions to control delivery of charge material into the basket includes a mechanism for moving the loading gate from closed position to a gate full open position that is variable in extent to adapt it for various loading properties of the charge material, together with a controller for moving the loading gate from the gate full open position to a pinch position to slow delivery of charge material into the basket and for determining the extent of the gate opening in pinch position in predetermined relation to the extent of gate opening in the preceding gate full open position.

11 Claims, 7 Drawing Sheets

R1, R2
40
CONTROL BOX
46
P1
P2
P3
12
PRESSURE
FLUID
68
VALVES
47
70
72
18
60
54
56
64
25
64
42
58
62
20
TRANSMITTER
AND POWER SUPPLY
52
34
22
68
62
66
53
10
23
50
28
24
30
49
44
26
16
14
15
32
48
S

LOADING CONTROL SYSTEM FOR A CYCLICAL CENTRIFUGAL MACHINE WHICH ADJUSTS PINCH POSITION

FIELD OF THE INVENTION

The present invention relates to a method and apparatus for controlling the flow of material through a loading gate into a rotating centrifugal basket in order accurately and quickly to deliver into the basket a certain desired amount of the material to be treated in a cycle of operation of the centrifugal machine.

More specifically, the invention relates to a system for automatically adjusting the extent of opening of a loading gate as material is being delivered through the gate to form a charge wall in a centrifugal basket, so that before the desired final charge wall thickness is reached and the gate then closed, a flow pinching position of the gate is established which will depend in extent upon the extent the gate is open when in a full open position employed for the principal part of a basket loading operation. The flow pinching position thus is varied in different basket loading operations in accordance with changes of the gate full open positions employed for these operations and, accordingly, in desirable relation to variations of the loading properties, such as the fluidity or viscosity of the charge material to be processed in the machine.

BACKGROUND OF THE INVENTION

The system of the present invention has application especially in connection with the operation of heavy cyclical centrifugal machines of the type used in the manufacture and refining of sugar.

The known systems for controlling the loading of charge material into the baskets of such machines do not adequately enable compensation for variations in the loading properties of the charge material to be processed. Such variations often occur from one batch to another, and even between earlier and later operations with different portions of the same batch, of a charge material such as sugar massecuite. When they occur they may adversely affect the uniformity of basket loading needed from cycle to cycle for efficient centrifugal processing. For example, a high fluidity can lead to overfilling of or even spillage of charge material from the basket; while with a viscous, slowly flowing charge material a sudden gate closing can leave the basket unevenly loaded, thus causing rough, unbalanced running of the machine.

Variations of loading properties of the charge material are often difficult or even impossible to avoid. In the case of sugar massecuites, for example, their amenability to being loaded into and processed in centrifugal machines will vary with numerous factors among which are the massecuite temperature, sugar grain size, degree of crystallization, syrup purity, and hydrostatic pressure head in the material supply tank.

Various proposals have been made to improve the speed and the control of centrifugal basket loading operations. U.S. Pat. No. 2,727,630 (Hertrich) discloses a system making use of a charge measuring device that is changed in position as the volume of the basket charge increases during loading of the basket. The loading gate is progressively closed as the charge measuring device is displaced by progressively increasing charge wall thickness in the basket, until the basket charge approaches the final desired volume. Then the gate is maintained at a pinched or largely closed position slowing flow of the material, until the final desired volume is reached. The gate then is quickly closed so that only a small amount of material can flow through the gate as it moves from the pinched to the fully closed position.

U.S. Pat. No. 3,011,641 (Huser) discloses a mechanism for preventing overloading of the basket when employing a manually controlled loading gate.

U.S. Pat. No. 3,079,046 (Goodwin) discloses a mechanism for adjusting the extent of opening of the loading gate in accordance with pressure conditions sensed in the loading spout of a supply tank holding the material to be processed in centrifugal operations, thus adapting the extent of gate opening to variations of the hydrostatic pressure head in the tank.

U.S. Pat. No. 3,141,846 (Laven, Jr.) discloses a mechanism making use of a mechanical charge feeler within the centrifugal basket, to be positioned by the charge wall being formed in the basket in each loading operation and thus controlling the thickness of the basket charge.

U.S. Pat. No. 4,229,298 (Bange) discloses a method and apparatus for controlling the thickness of the charge wall being formed in the basket in each loading operation, wherein an electrical capacitance is established across the charge space inside the basket and a signal for regulating the loading is obtained by sensing the change of capacitance that results as the charge wall thickness is increased by the inflow of charge material.

SUMMARY OF THE INVENTION

It is an object of the present invention to provide a system for improving the control and uniformity of centrifugal basket loading operations under conditions which involve variations in loading properties, such as the fluidity, or viscosity, of the charge material to be processed.

Another object of the invention is to provide a system for controlling the extent that a loading gate will be open when in a flow pinching position thereof near the end of a basket loading operation in predetermined relation to the extent the gate is open in a gate full open position selected for the principal part of the loading operation. Thus, when a greater or a lesser opening of the gate is selected to adapt its full open position to the flow properties of the charge material, the control system will bring about an ensuing flow pinching position of the gate, preceding the complete closing thereof, that can also be related appropriately to those flow properties.

The above-mentioned and other objects and advantages of the invention are achieved by the provision of a loading control system, for a centrifugal machine installation including a rotary centrifugal basket and a normally closed loading gate movable to and from open positions for delivery of charge material through the gate into the basket, which system comprises means operable in each basket loading operation for moving the loading gate from closed position to a gate full open position that is variable in the extent the gate is open to adapt it for loading properties of the charge material, together with means operative when the load in the basket approaches a desired final volume for moving the loading gate from the gate full open position to a pinch position to slow said delivery, and means determining the extent the gate is open when in the pinch position in predetermined relation to the extent the gate is open when in the gate full open position.

Thus, for unusually thick or viscous charge materials, for which the machine operator would normally select and use the maximum possible opening of the loading gate as the gate full open position, the gate will be brought by the control system to a relatively large pinch position opening for completion of the basket loading operation. For charge material of more normal fluidity, the gate full open position will be less than the maximum gate opening and the gate opening at pinch position will also be less, substantially proportionally. On the other hand, for highly fluid charge material, the extent the gate is open at the gate full open position may be quite small, and a minimum gate opening normally will be provided as the pinch position for completing loading of the basket.

The loading control system according to the invention preferably includes a pinch position circuit that is rendered operative in each loading operation when the charge wall of material loaded into the basket approaches the required final thickness. The pinch position circuit determines the extent of gate opening in the pinch position in response to a gate full open signal representing the extent the gate is open when at gate full open position.

Further features of the invention and particulars of the construction and operation of a preferred embodiment thereof will be apparent from the following detailed description considered with reference to the accompanying drawings.

BRIEF DESCRIPTION OF THE DRAWINGS

FIG. 7 also graphically depicts the effect which variation of a "pinch adjust" component of the circuit of FIG. 5 has on the diagrammed relationship.

DETAILED DESCRIPTION OF THE INVENTION

Figure 1:
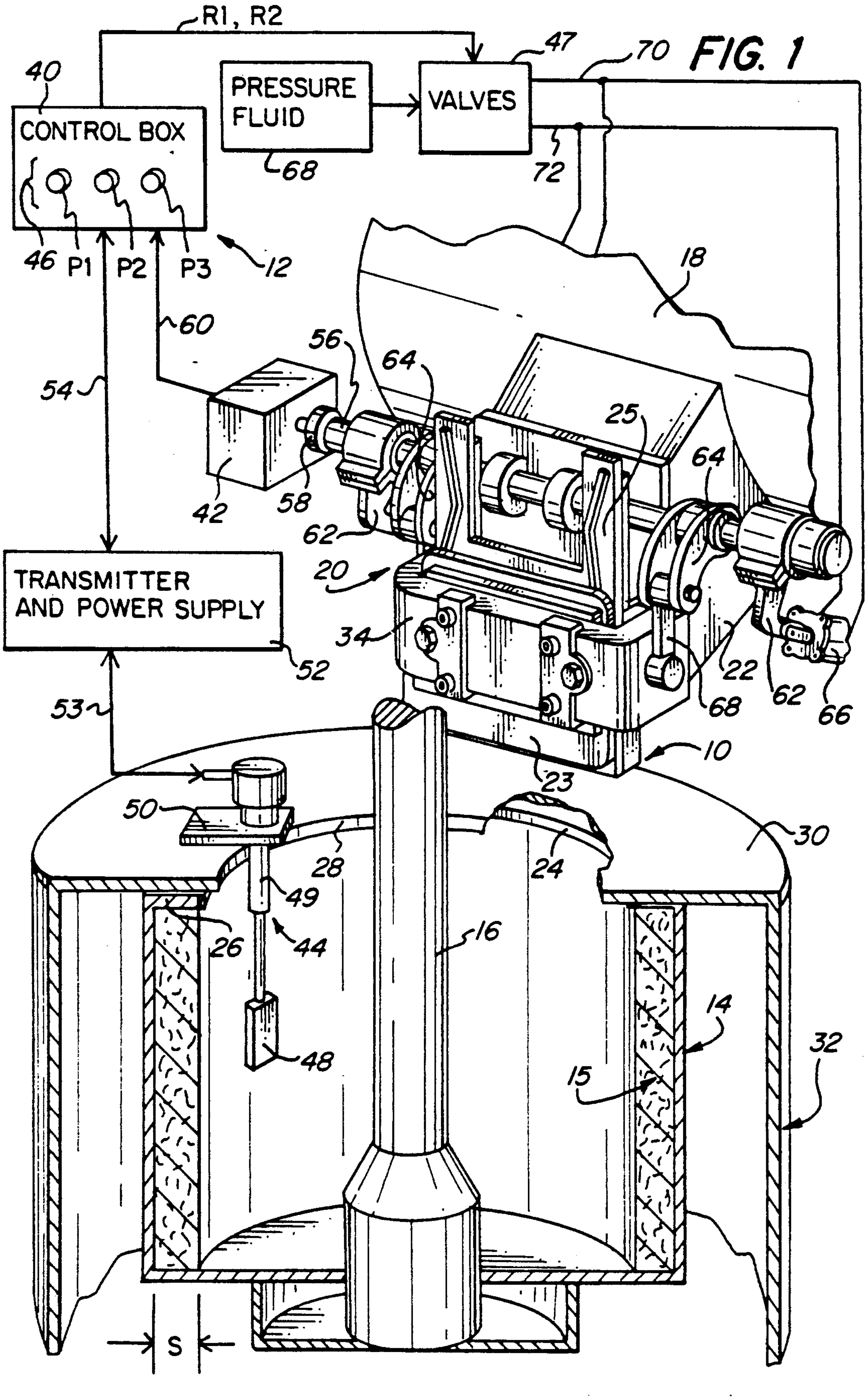
FIG. 1 is an isometric, schematic view of portions of a cyclical centrifugal machine and a loading gate for delivering charge material into the basket of the machine, with schematic illustration of components of a loading control system in accordance with the invention.

FIG. 1 schematically depicts portions of a heavy cyclical centrifuge machine 10, a loading gate assembly 20, and a loading control system 12 in accordance with the invention.

The centrifugal machine comprises a perforated cylindrical basket 14 carried on a spindle 16 that is suspended from a gyratory head (not shown) for gyratory motion and is rotated by a rotary prime mover (also not shown). The shaft and basket are driven at high centrifuging speed for processing a load of charge material in the basket, and at lower speeds during other phases of cyclical machine operation.

Charge material is delivered into the basket 14 from a storage or supply tank 18 by a loading gate assembly, generally indicated at 20, that is mounted at the mouth of a spout 22 extending from the tank 18. The material flowing from the loading gate passes into basket 14 through a central opening 24 in its top wall 26, reaching it through an opening 28 in the top 30 of a cylindrical curb structure 32 that surrounds the basket.

The charge material comprises both solid and liquid components. It typically is delivered into the basket while the basket is being rotated at a relatively low speed suited for forming the incoming charge material, by centrifugal force, into a cylindrical charge wall 15 supported against the side wall of the basket in a basket charge space S. When the charge is centrifuged, liquid is expelled from the solids held in the charge wall 15. The liquid passes through screens and perforations (not shown) in the side wall of the basket.

Loading gate assembly 20 comprises a movable gate member 23 slidable along its rear face to and from open positions on a facing plate 25 mounted about the mouth of spout 22. A crosshead member 34 extends across the front face of gate member 23 to support the rear face of gate member 23 against facing plate 25, and to aid in sliding gate member 23 to and from its open positions as described more particularly in U.S. Pat. No. 2,801,035 (Hertrich).

In a typical basket loading operation, for each cycle of operation of the centrifugal machine, the loading gate 23 is first moved upward to a gate full open position selected by the machine operator to enable relatively rapid flow of charge material through the gate opening for quick filling of the material up to nearly the desired final volume in the basket 14. Then the gate 23 is moved downward to a certain flow pinching position, to slow the delivery of charge material into the basket during a final loading stage for completing the filling. For example, for a loading gate that can provide a maximum gate opening about 10 inches deep, the gate opening in pinch position normally would be about 2 inches, and the gate full open position selected by the operator for the principal part of a loading operation would be in the range of from 2 to 10 inches, depending on observed flow properties of the charge material.

The loading control system 12 includes a control box 40 which receives signal inputs from an encoder 42, also from a transmitter 52 connected with a capacitance probe 44, and also via operator-settable controls 46. These controls include three potentiometers P1, P2 and P3 having respective setting knobs on box 40. Two additional operator-settable controls TP1 and TP2 are located within control box 40. With P3, for example, an operator can set a control voltage FWTSP corresponding to a final wall thickness desired to be present in the basket 14 when the gate is closed to end each loading operation. Another control, Pl, can be adjusted to set the gate full open position desired for the loading operation. Control P2 sets a proportion of full open position which determines pinch position.

Probe 44 includes an electrically conductive plate 48 suspended by tube 49 from a bracket 50 secured to the top 30 of curb structure 32. Plate 48 is thereby positioned within basket 14 inwardly of its charge space S and preferably substantially parallel to the basket side wall. A voltage maintained across the space between the basket side wall and plate 48 creates an electrical field having a capacitance that varies with the amount of charge material in space S. Probe 44 senses the magnitude of that capacitance, and transmitter 52 transmits along line 54 to controller 40 a corresponding current signal representing the sensed capacitance.

Transmitter 52 is calibrated, for example, so that its current signal amounts to 20 mA when the basket 14 is empty, and as the basket is being loaded the signal magnitude will decrease, for instance, from 20 mA for zero load down to 4 mA for the fullest load the basket will allow. Such utilization of a current signal decreasing with increasing basket load is a fail safe consideration. In the event of a system or power failure during a loading operation, the controller 40 closes the gate, being led to believe the basket is full.

Devices suitable for use as the capacitance probe 44 and the transmitter 52 are available commercially under the name DREXELBROOK from Drexelbrook Engineering Company, Horsham, Pa.

The loading gate 20 normally is held tightly closed. It is moved to and from open positions by rotation of a gate shaft 56 which is connected through crank arms 62 with fluid pressure cylinders 66 (only one shown) that move the arms 62 to turn the shaft 56. Gate lifting arms 64 mounted on shaft 56 are connected by links 68 to a crosshead 34 so that a turning of gate shaft 56 by the pressure cylinders 66 will lift the crosshead and thus will move the gate 23 along its facing 25 to an open position enabling flow of charge material from spout 22. Under the direction of controller 40, valves 47 pass fluid under pressure from a source 68 along lines 70 and 72 to the cylinder 66 to control the extent of opening and the closing of the loading gate.

An encoder means 42 associated with the gate shaft 56 senses the angular position of shaft 56 and correspondingly, when the gate 23 is away from its normal closed position, produces a gate position signal representing the extent of opening of the loading gate. The means 42 may be, for example, a commercially available KYTRONICS feedback encoder, and may be located on an end 58 of the gate shaft. With such an encoder, the shaft rotation that opens the loading gate moves a magnetic lever over field effect sensors. Interpreting circuitry converts the sensed extent of turning movement to a digital gate position indicating signal that is passed along line 60 to controller 40. In this way, the extent the loading gate is open is continually sensed and reliably signalled without need for electrical parts to move or rub relative to one another in a way susceptible to becoming unreliable under adverse conditions of use, such, for example, as the humid, sticky environments of sugar centrifugals.

The controller 40 makes use of the charge wall thickness signal from the transmitter 52 and the gate position signal from the feedback encoder 42 to control the loading gate via two current outputs, designated R1 and R2. These outputs may be, for example, 120 volt A.C. outputs that can directly drive air solenoid valves at 47 to position the gate. When desired, however, the gate control signals may be routed to inputs of a programmable logic controller (not shown but considered includable in control box 40) that will control the gate via outputs to the solenoid valves.

Figure 2:
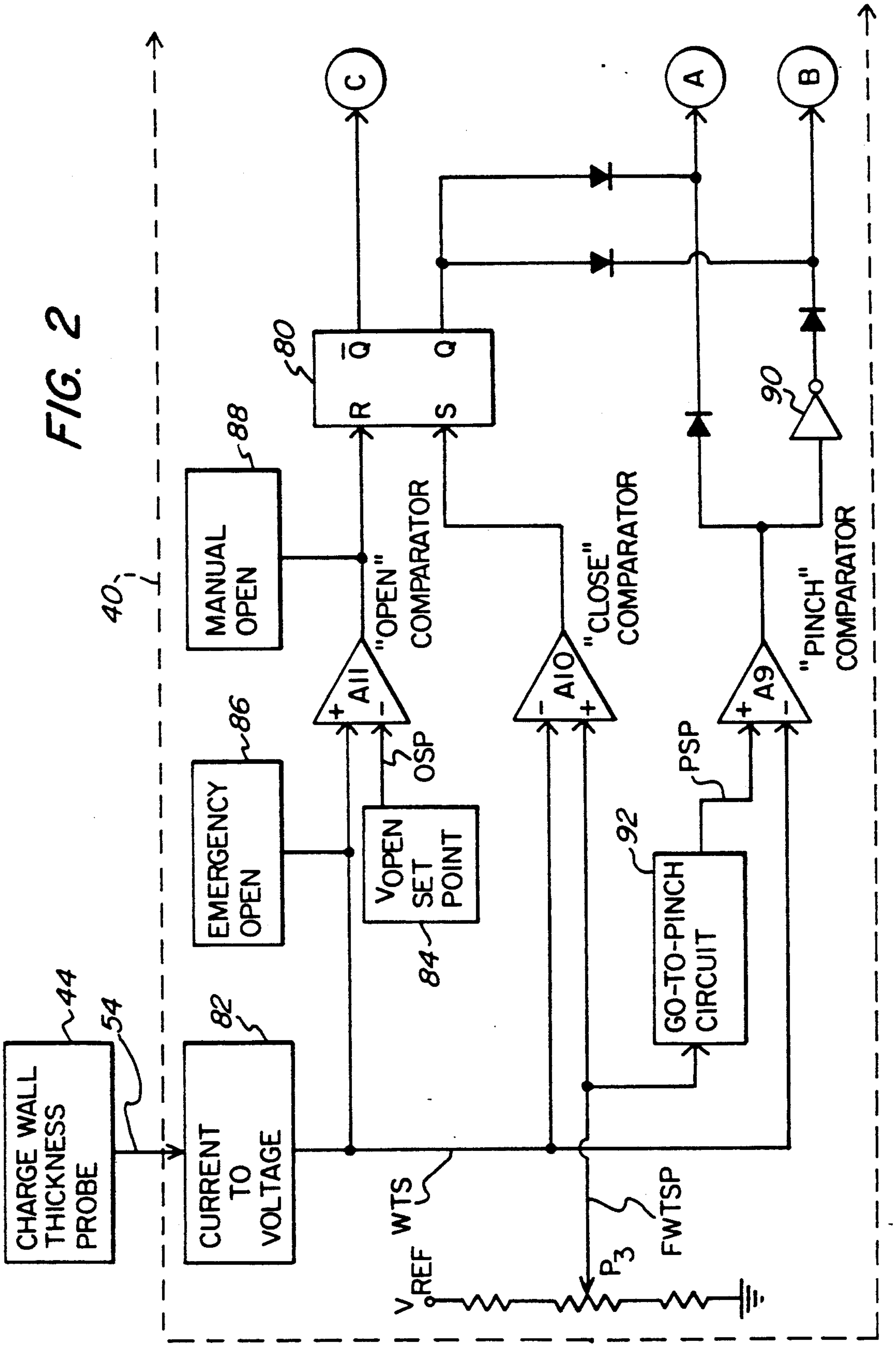
FIGS. 2 and 3 are block diagrams of gate control circuitry of the loading control system of FIG. 1.
Figure 3:
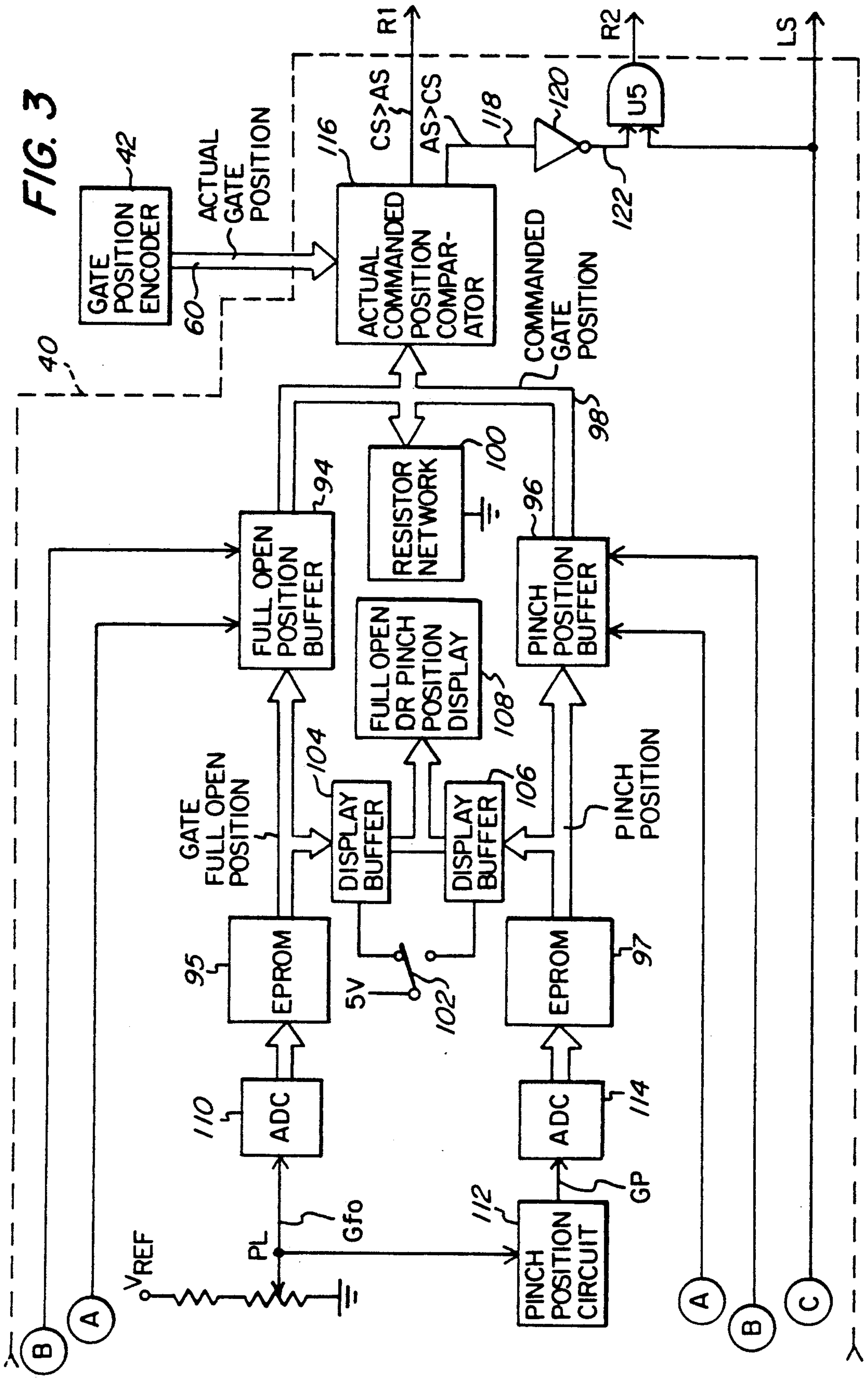

The contents of control box 40 are diagrammatically illustrated in FIGS. 2 and 3. FIG. 2 illustrates circuitry which, making use of a flip-flop 80 and comparators A9, A10 and A11, generally controls the conditions or time for movement of loading gate 23 from closed to a full open position, then to pinch position, and finally back to closed position. FIG. 3 illustrates circuitry which generally determines the extent of opening of the loading gate in gate full open position and the extent of opening of the gate in the pinch position.

Referring more specifically to FIG. 2, the position that the loading gate will be in at any time depends upon the state of flip-flop 80 and the outputs of an "open" comparator A11, a "close" comparator A10 and a "pinch" comparator A9. If the output from "close" comparator A10 goes high putting flip-flop 80 in a "set" state, loading gate 23 is in or will be moved to closed position. When flip-flop 80 is in reset condition, the loading gate is in or will be moved to either full open position or pinch position, depending upon the sensed thickness of the charge wall in the centrifugal basket. The three comparators and flip-flop 80 determine the conditions existing at pin terminals A and B which interface with desired position circuitry (FIG. 3) to maintain control of the loading gate. The truth table is:

| pin terminal A | pin terminal B | gate action |
|---|---|---|
| low | high | full open |
| high | low | pinch |
| high | high | close |

Comparators A9, A10 and A11 each receives a wall thickness signal voltage input WTS for comparison to one of three different voltage set points. Voltage WTS is produced by a current to voltage conversion at 82 of the charge wall thickness current signal produced by probe 44 and transmitter 52. Thus, the magnitude of WTS will vary in inverse proportion to charge wall thickness; as the charge wall thickness increases the current on line 54 and the WTS voltage decrease.

The "open" comparator A11 compares voltage WTS at its "+" input with an open set point voltage OSP from source 84, which is selected to correspond to the value of WTS for an empty or nearly empty basket. When basket 14 is empty, WTS will be greater than OSP and the output of the "open" comparator All will go high, resetting flip-flop 80 and causing opening of the loading gate. When flip-flop 80 is thus initially reset, the output of "pinch" comparator A9 is low (WTS being large), causing the voltage at pin terminal A to be low and the voltage at pin terminal B to be high due to action of an inverter 90. With A low and B high, loading gate 23 is moved to full open position per the above truth table.

An emergency open circuit 86 is also provided for opening gate 23 in an emergency by adding voltage to WTS so that the voltage at the "+" input of comparator A11 will be greater than OSP.

Further, a "manual open" circuit 88 can supply to flip-flop 80 a voltage large enough to reset the flip-flop. Upon this resetting, however, the action of the gate will depend on the basket load condition, being determined by the magnitude of the WTS voltage and its effect via the "pinch" comparator A9 and the "close" comparator A10. If the basket 14 is empty or partially filled, "manual open" circuit 88 may be used to open the loading gate for complete filling of the basket.

In the course of basket loading, the current produced by probe 44 and thus the WTS voltage will drop. The "pinch" comparator A9 compares the falling WTS voltage at its "−" input with a "pinch set point" voltage PSP generated by "go-to-pinch" circuit 92 indicated by a block in FIG. 2. The particulars of "go-to-pinch" circuit 92 are diagrammed in FIG. 4.

The PSP voltage corresponds to a certain thickness of the charge wall being formed in basket 14, at which the loading gate is to be moved from gate full open position to pinch position. This thickness, is selectable as a proportion of the desired final charge wall thickness as described more particularly hereinafter. When the WTS voltage falls below the preset PSP voltage, the output of "pinch" comparator A9 turns to high and brings pin terminal A to high state while bringing pin terminal B to low state due to inverter 90. With A high and B low, loading gate 23 is moved to pinch position per the above truth table, and the delivery of charge material is slowed to improve the accuracy and control of the final stage of filling of the basket.

The final charge wall thickness used in basket loading operations may differ, for example, due to varying massecuite types and/or mill operating conditions. Accordingly, means are provided, such as the potentiometer P3, for the operator to select the final charge wall thickness at which the loading gate 23 will be closed to end a loading operation. For each selected final wall thickness, potentiometer P3 provides a corresponding final wall thickness set point voltage (FWTSP) which, via the "close" comparator A10 and flip-flop 80, will cause the loading gate to close when the charge wall in the basket reaches the desired final thickness—at which time voltage WTS falls below the FWTSP voltage.

For each selected final charge wall thickness, except in cases of abnormally light basket loading, there is a limited range of lesser charge wall thicknesses within which a wall thickness suitably related to the final wall thickness can be selected and used as a measure of when the loading gate is to be moved to pinch position to slow the flow of charge material into the basket.

Figure 6:
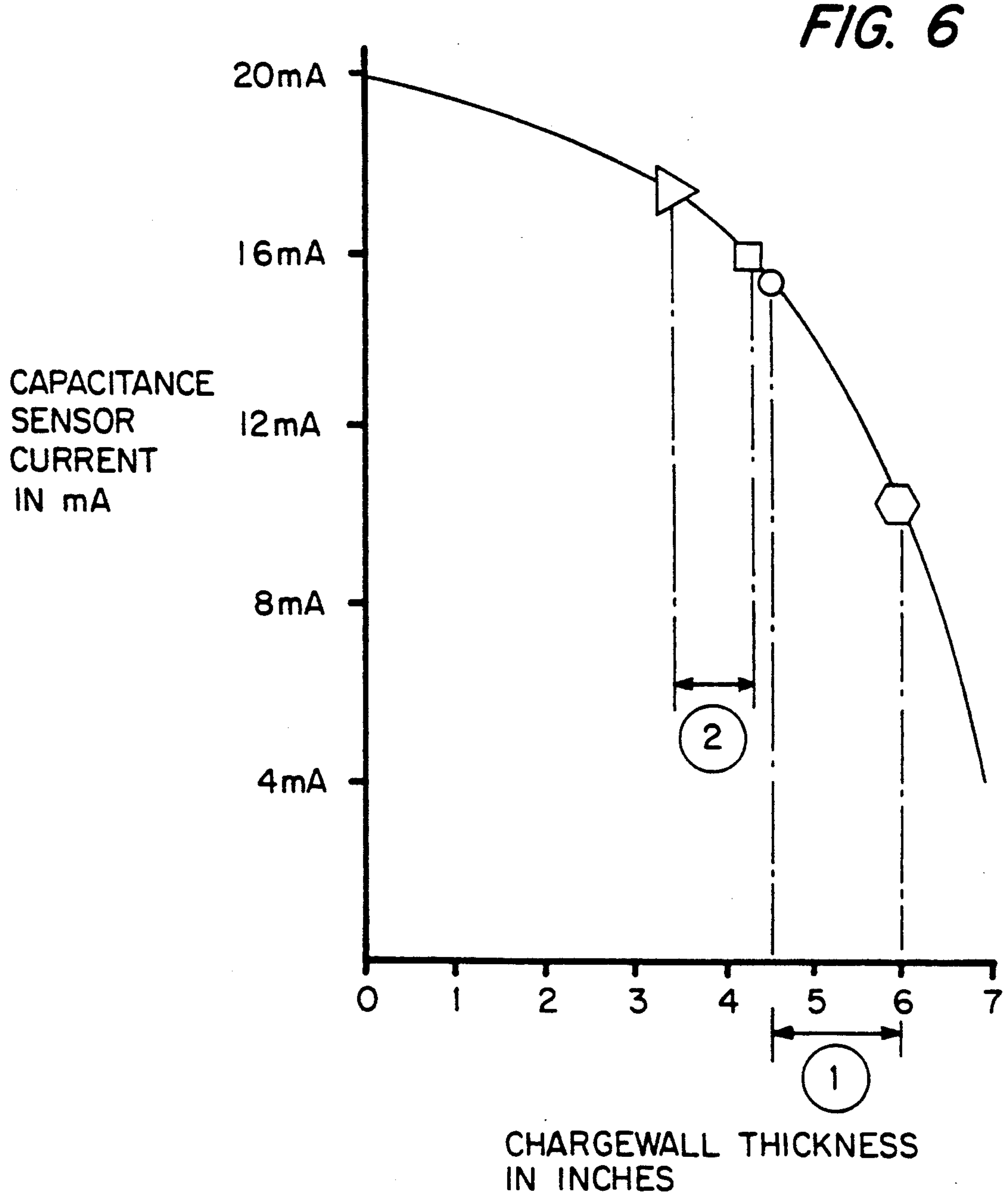
FIG. 6 is a graph depicting a relationship between final charge wall thicknesses and ranges of suitable "go-to-pinch" charge wall thicknesses for processing a charge material such as sugar massecuite.

Typical relationships of the final charge wall thickness and ranges of "go-to-pinch" charge wall thicknesses suitable for processing a charge material such as sugar massecuite are illustrated schematically in FIG. 6 of the drawings. The curve on the graph indicates the progressive reduction of capacitance sensor current, ranging for example from about 20 mA to about 4 mA, during a basket loading operation as the charge wall thickness in the basket increases from nil to about 7 inches. For loading operations in which the final charge wall thickness is to be 7 inches, symbol 1 on the graph indicates a range of lesser wall thicknesses, e.g., of from about 4.5 to about 6 inches, and corresponding capacitance sensor currents of about 15½ mA down to about 10½ mA, within which a value is selected for movement of the loading gate 23 to pinch position. For a final charge wall thickness of 5 inches, symbol 2 on the graph indicates an appropriate "go-to-pinch" wall thickness range of from about 3½ to about 4¼ inches, corresponding to capacitance sensor currents of about 17 mA down to about 15½ mA.

Referring now specifically to FIG. 3, the conditions established at pin terminals A and B control the operation of a gate full open position buffer 94 and a pinch position buffer 96. When A is low and B is high, buffer 94 passes a digital signal representing the desired extent of gate opening in the gate full open position, corresponding to a voltage set by potentiometer P1, from an EPROM 95 onto a commanded gate position bus 98. When A is high and B is low, buffer 96 passes a digital signal representing the desired extent of gate opening in the pinch position corresponding to a voltage produced by a pinch position circuit 112, from an EPROM 97 onto the bus 98. When both A and B are high, i.e., flip-flop 80 has been set by "close" comparator A10, no signal is allowed to pass from either of buffers 94 and 96 and a resistor network 100 keeps the digital signal state of commanded gate position bus 98 low, with indication that the commanded position of the loading gate is closed position.

The magnitude of voltage GFO can range from a value corresponding to the closed position of loading gate 23 to a value corresponding to the maximum possible opening of the loading gate, and is proportionally related to the extent of loading gate opening. The gate full open position represents the fullest extent of opening of the loading gate that is to be utilized for loading a particular charge material to be processed in the centrifugal machine; it may, but ordinarily does not, correspond to the maximum possible opening of the loading gate. An analog to digital converter 110 converts the voltage GFO into a corresponding digital voltage signal which EPROM 95 converts into a digital signal that represents the desired gate full open position. That signal may pass into bus 98 via a latch buffer 94; and when desired, via a buffer 104, it will appear visibly on a display 108.

The gate pinch voltage GP as generated by pinch position circuit 112 (see FIG. 5) is converted by analog to digital converter 114 into a digital voltage signal which in turn is converted by EPROM 97 into a digital signal representing the desired gate pinch position. This signal may pass into bus 98 via a latch buffer 96 and, when desired, it will activate display 108 via a buffer 106. As FIG. 5 indicates, and described more fully below, circuit 112 generates GP as a function of the magnitude of the gate full open signal GFO (preselected by the operator via potentiometer P1), with control effected via inputs "V KNEE" and "PA" from variably settable potentiometers TP1 and P2, respectively.

Switch 102 controls display buffers 104 and 106 so that one or the other of them can be activated to pass signals corresponding to either the gate full open position signal GFO or the pinch position signal GP to display 108 for visual representation of either of these signal values.

The commanded gate position bus 98 can contain at a time only the gate full open position signal from buffer 94 or the pinch position signal from buffer 96, or the closed position signal existing when no effective signal passes either buffer 94 or buffer 96.

A digital comparator 116 (FIG. 3) receives the commanded gate position signal present in bus 98 and compares it with the actual gate position signal received along bus 60 from gate position encoder 42 (see FIG. 1). Outputs from digital comparator 116 then can occur along loading gate control line Rl and, via line 118, along loading gate control line R2. Control lines R1 and R2 actuate the valves at 47 that control the pressure fluid carried by lines 70 and 72 to cylinders 66 (see FIG. 1) for positioning loading gate 23. When pressure is applied via line 70, line 72 being open, the pistons in cylinders 66 are moved forward to open loading gate 23. When pressure is applied via line 72, line 70 being open, the pistons of cylinders 66 are retracted with movement of the loading gate toward closed position. The loading gate is effectively held in a given position when, having reached that position, fluid pressure is applied equally via lines 70 and 72 into both ends of the cylinder 66.

Line R1 is active, or "high", when the commanded gate position signal (CS) is greater than the actual gate position signal (AS), i.e., CS>AS; conversely, line 118 is active, or "high", when the actual gate position signal is greater than the commanded gate position signal, i.e., AS>CS. When the commanded gate position signal is equal to the actual gate position signal, lines R1 and 118 both go low, or inactive. Control line R2 carries the output from an AND gate U5 which receives from line 122 via inverter 120 an input opposite in state to the signal on line 118. The other input to gate U5, which is received via pin terminal C, is the Q output of flip-flop 80 (FIG. 2).

When R1 goes high, line 118 goes low, and line 122 goes high. The notQ output, so pin terminal C, is also high because flip-flop 80 is in reset condition, i.e. "open" comparator A11 is indicating that loading gate 23 should be open. Thus the conditions for R2 being high, imposed by AND gate U5, are met and the loading gate is moved open.

When line 118 goes high due to the actual gate position being greater than commanded, lines 122 and Rl go low. When line 122 is low, R2 will also be low and the loading gate is moved toward closed position.

When both of lines Rl and 118 are low, with the actual loading gate position corresponding to the commanded gate position, line 122 is high and pin terminal C may be either high or low. Pin terminal C will be high while flip-flop 80 remains reset, i.e., while loading gate 23 is in gate full open or pinch position. When pin terminal C is high, R2 will also go high via AND gate U5 and loading gate 23 will effectively be held in its existing position by the fluid pressures of lines 70 and 72 counteracting each other in the fluid pressure cylinders 66. However, if the flip-flop 80 is set by an output of "close" comparator A10, the Q output and pin terminal C are forced to low state and R2 goes low. Then, with both R1 and R2 low, the loading gate not only is closed but stays forced shut until flip-flop 80 is reset to begin a new basket loading operation.

Figure 4:
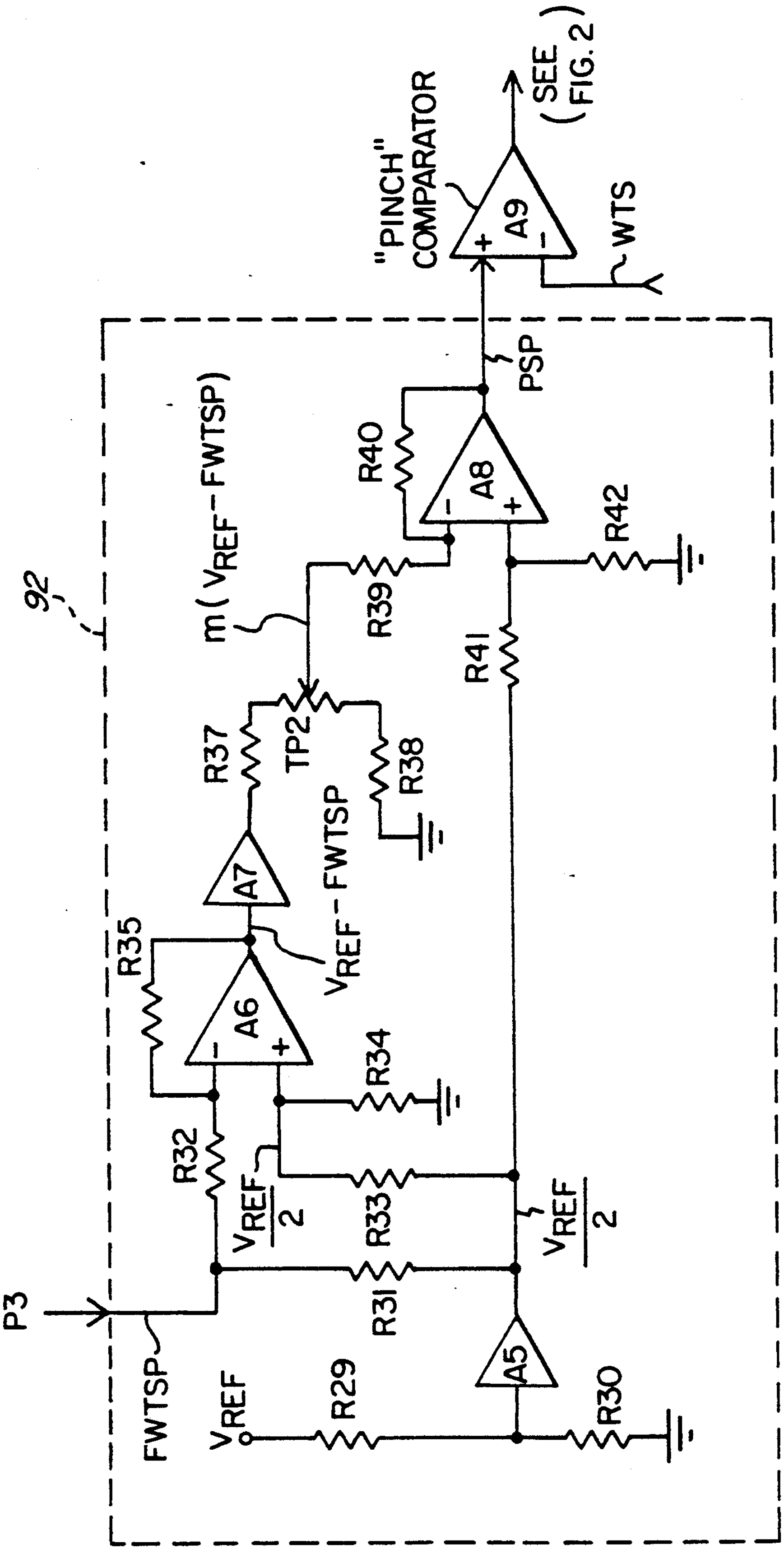
FIG. 4 is a diagram of components of a "go-to-pinch" circuit represented by a block in the diagram of FIG. 2.

A "go-to-pinch" circuit suitable for the functions of circuit 92 in FIG. 2 is illustrated in additional detail in FIG. 4. The FWTSP voltage input to circuit 92 is passed through a series of operational amplifiers A6, A7 and A8. Amplifier A6 has FWTSP as its "−" input and has the output of an amplifier A5 as its "+" input. With R29 and R30 having approximately equal values of resistance, the output of amplifier A5 is one half of a reference voltage (Vref/2). Vref conceptually corresponds to the charge wall thickness voltage, i.e., signal WTS, for an empty basket. With resistances R32, R33, R34 and R35 substantially equal, the output of amplifier A6, i.e., Vref-FWTSP, being a voltage derived from the possible settings of potentiometer P3, can itself range from a voltage signifying an empty basket through a voltage signifying a basket filled to the maximum possible final charge wall thickness. Resistors R31, R33 and R34 are used to limit bias effects.

A pinch set point adjusting potentiometer TP2 receives the output from amplifier A6. TP2 can be set to provide as its output a voltage proportionately related to the A6 output, as by a factor m, so as to assure a desired ratio of the charge wall thickness at which the gate is to go from gate full open position to pinch position to the final charge wall thickness determined by signal FWTSP.

The output from TP2, expressible as m (Vref-FWTSP), becomes the "−" input of an amplifier A8, VREF/2 again being the "+" input. Resistances R39, R40, R41 and R42 being substantially equal, the output of amplifier A8, expressible as Vref-m(Vref-FWTSP), provides the "go-to-pinch" set point voltage signal PSP for input to the "pinch" comparator A9 (FIG. 2). This signal will be varied in magnitude by adjustments of the FWTSP signal, though in a certain proportional relationship thereto. So, a change of the FWTSP voltage alters how much charge material will be in the basket when the gate is moved to pinch position, but will not change the timing proportion set by TP2.

Figure 5:
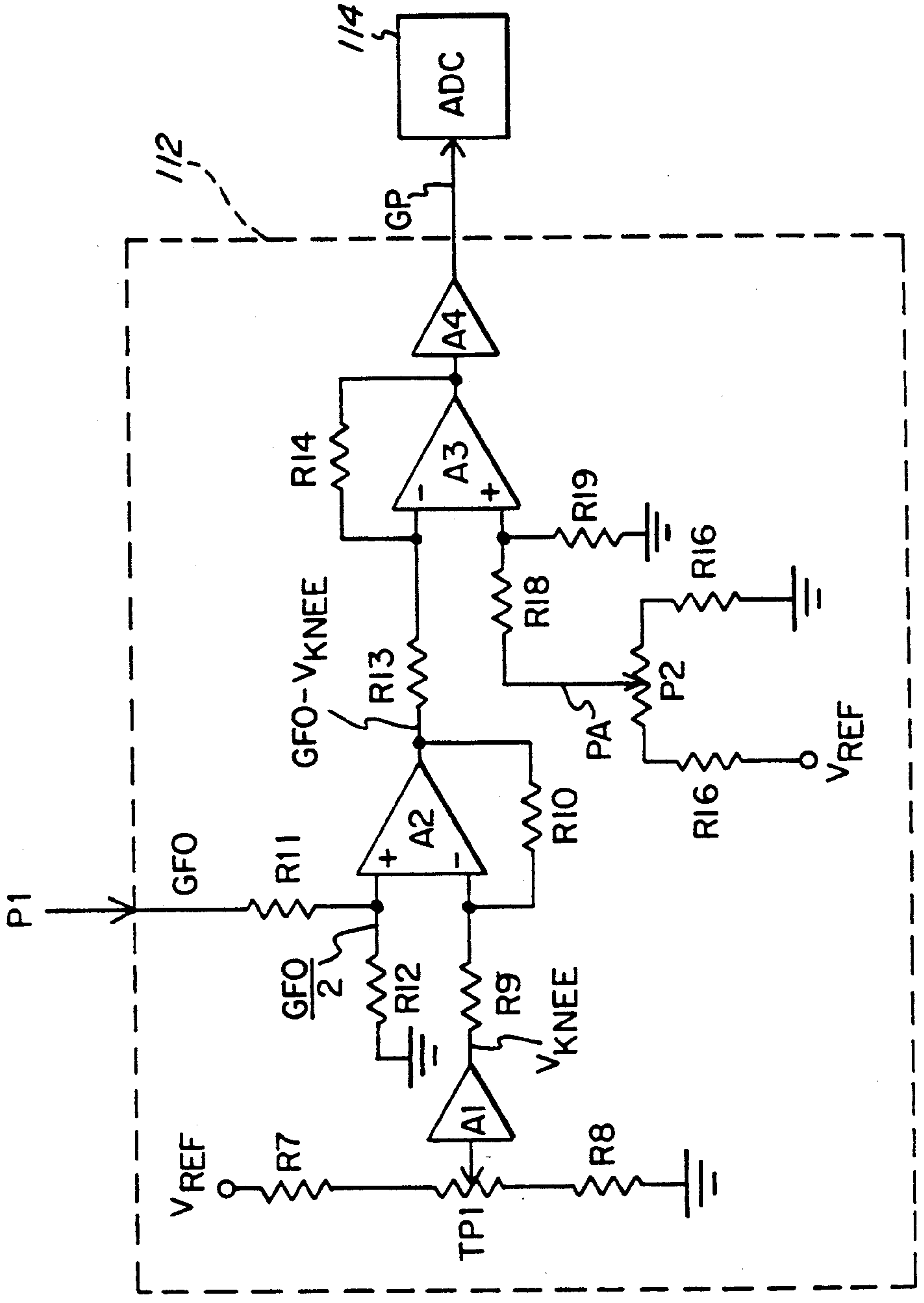
FIG. 5 is a diagram of components of a pinch position circuit represented by a block in the diagram of FIG. 3.

Additional particulars of the pinch position circuit 112 will now be described with reference to FIGS. 5, 7 and 8.

The magnitude of voltage GFO, which is input from potentiometer P1 to pinch position circuit 112 (FIG. 5), determines the extent of gate opening when loading gate 23 is in the gate full open position. With resistances R11 and R12 substantially equal, a voltage GFO/2 is the "+" input of an operational amplifier A2. The "−" input to amplifier A2 is a voltage, designated V KNEE, derived from a "KNEE adjust" potentiometer TP1. The "KNEE", as illustrated in FIG. 7, is a point along a graph of gate pinch positions relative to gate full open positions at which the extent the gate is kept open in its pinch position begins to increase with increased gate full open position. An adjustment of the TP1 potentiometer with change of the magnitude of voltage V KNEE will change the range of gate full open positions in which the gate opening at pinch position increases with increased gate full open position, but leaves the gate opening in pinch position at a minimum for a range of abnormally low gate full open positions (see FIG. 8). Thus, under normal gate operating conditions, an adjustment of TP1 will increase or decrease the pinch position opening corresponding to the gate opening at a given gate full open position.

The amplifier A2 and other operational amplifiers employed in the control circuit preferably are one-sided, so that their outputs cannot go negative. Thus, with R9, R10, R11 and R12 substantially equal, the output of A2, i.e., GFO-V KNEE, generally will be in the range from 0 to 1 volt, at a value amounting to a fraction of the magnitude of voltage GFO. The output of amplifier A2 is the "−" input to operational amplifier A3, the "+" input of which is a voltage equal to one half of the pinch adjust voltage PA set by potentiometer P2. An adjustment of voltage PA raises or lowers the entire operating line as illustrated in FIG. 7. The output of amplifier A3, i.e., the gate pinch voltage signal GP, corresponds to PA-(GFO-V KNEE). The magnitude of GP is inversely related to the extent of loading gate opening in gate full open position; so the minimum gate opening at pinch position corresponds to a maximum GP. GP has its maximum magnitude when GFO-V KNEE is zero, i.e., when GFO as selected by the operator on P1 is less than or equal to V KNEE.

Figure 7:
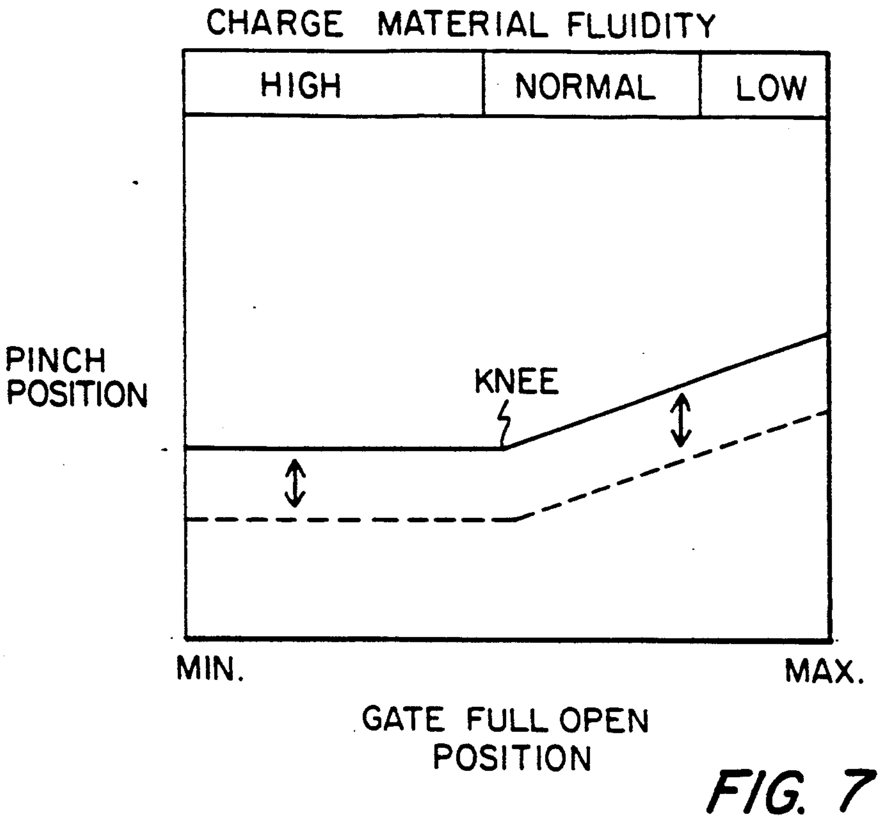
FIG. 7 is a graph depicting a relationship between gate full open positions and gate pinch positions that may be provided by a loading control system according to the invention for the processing of charge materials, such as sugar massecuite, that may vary greatly in fluidity.
Figure 8:
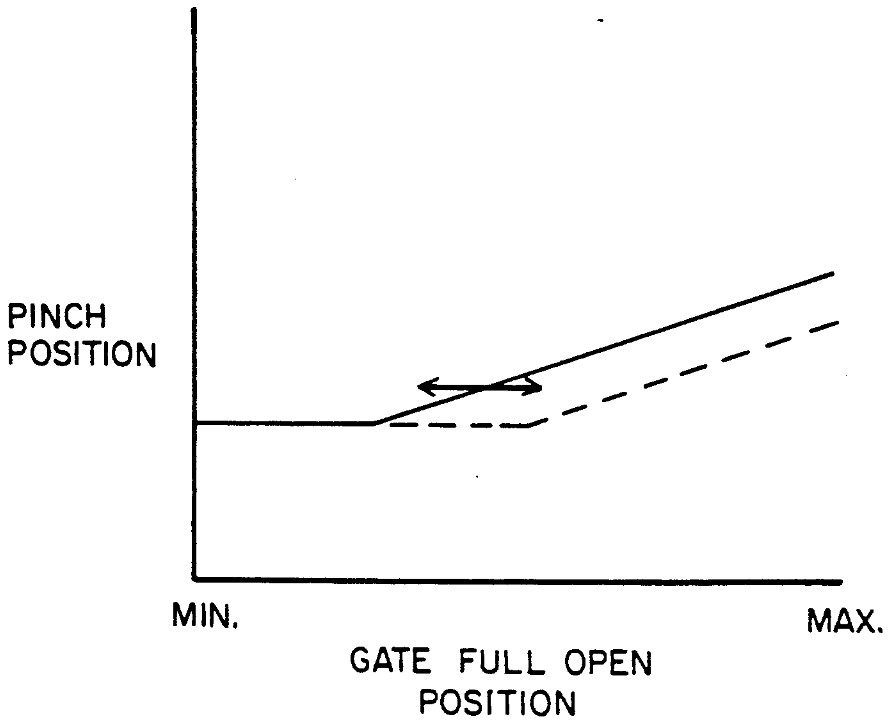
FIG. 8 graphically depicts an effect which variation of a "knee adjust" component of the circuit of FIG. 5 has on the relationship diagrammed in FIG. 7.

Referring to FIG. 7, for selected gate full open positions less than or equal to the gate opening provided at the KNEE point, the pinch position circuit will automatically select a minimum pinch position gate opening only a little smaller than a gate full open position considered normal for very fluid charge materials. For selected gate full open positions greater than that at the KNEE point, the gate opening at pinch position is increased in proportion to increases in the opening at gate full open position.

In the use of the present loading gate control system, an operator attending to one or more centrifugal machines, having made an evaluation of loading properties of the charge material to be processed, can set potentiometer P1 to provide in each loading operation, based upon the operator's experience and judgment, a certain extent of opening of the loading gate for its gate full open position. The operator will also set potentiometer P2 for selection of an extent of opening of the loading gate appropriate for its pinch position, in relation to the selected gate full open position; and will set potentiometer P3 for selection of the final charge wall thickness in the centrifugal basket at which the loading gate is to be closed and held shut.

As loading properties of the material to be processed undergo change, the operator will make compensating change of the gate full open position set via potentiometer P1. The pinch position circuit of the control system will then automatically select a corresponding extent of gate opening to be had at the pinch position of the loading gate. For near normal up to the maximum possible gate full open positions, the loading gate control system of the invention enables the extent of the gate opening in pinch position to be kept substantially proportional to the various extents of opening given to the loading gate as its gate full open position.

Although the invention has been described and illustrated in the drawings with reference to particular embodiments, features, and the like, many modifications and variations will be apparent or ascertainable to those of skill in the art. The invention is intended to be defined by the appended claims, and is not limited to particulars of the specification or the drawings except as may be required for fair interpretation of the claims.

What is claimed is:

1. In a centrifugal apparatus including a rotary centrifugal basket, a loading gate movable between closed and open positions to control the delivery of charge material through said gate for loading the basket and control means operative in response to each opening of said gate for closing said gate when a certain final volume of charge material is accumulated in the basket, said control means comprising:

means for moving said gate from a closed position to a gate full open position that is variable in extent to adapt it for loading properties of the charge material;

means operative in response to the load in the basket approaching said final volume for moving the gate from the gate full open position to a pinch position to slow said delivery;

means operative in response to the load reaching the final volume for moving the gate from the pinch position to the closed position;

and means operative in response to a variation of the extent of the movement of the gate to said gate full open position to adjust automatically the extent the gate will be open when in said pinch position.

2. Centrifugal apparatus according to claim 1, said pinch position adjusting means including means for producing a signal proportional in magnitude to the extent the gate is open in said gate full open position to determine the extent the gate will be open in said pinch position.

3. Centrifugal apparatus according to claim 2, said pinch position adjusting means including means for adjusting the proportional relationship between the extent the gate is open in said gate full open position and the extent the gate will be open in said pinch position.

4. Centrifugal apparatus according to claim 1, said loading gate comprising a rotatable gate operating shaft angular positions of which correspond respectively to the closed and various open positions of said gate, said gate moving means including a field-effect device associated with said shaft and operative upon opening movement of said gate to produce a digital signal representing the extent the gate is opened by such movement.

5. In a centrifugal apparatus including a rotary centrifugal basket, a loading gate movable between closed and open positions to control the delivery of charge material through said gate for loading the basket and control means operative in response to each opening of said gate for closing said gate when a certain final volume of charge material is accumulated in the basket, said control means comprising:

means for moving said gate from a closed position to a gate full open position that is variable in extent to adapt it for loading properties of the charge material;

means operative in response to the load in the basket approaching said final volume to move the gate from gate full open position to a pinch position to slow said delivery;

means operative in response to the load reaching the final volume for moving the gate from the pinch position to the closed position;

and means including a pinch position circuit operative in response to an extent of movement of said gate to said gate full open position within a certain range of extents of said movement to keep the ensuing movement of the gate to pinch position substantially proportional to said extent.

6. Centrifugal apparatus according to claim 5, said pinch position circuit including means operative to dispose said gate at a minimum extent of opening for said pinch position in response to preceding movement of said gate to a small gate full open position suited for loading the basket with charge material of abnormally high fluidity.

7. Centrifugal apparatus according to claim 6, said pinch position circuit including means for adjusting the extent of gate opening movement which corresponds to said small full open position.

8. In a centrifugal apparatus including a rotary centrifugal basket, a loading gate movable between closed and open positions to control the delivery of charge material through said gate for loading the basket and control means operative in response to each opening of said gate for closing said gate when a certain final volume of charge material is accumulated in the basket, said control means comprising:

means for moving said gate from a closed position to a gate full open position that is variable in extent to adapt it for loading properties of the charge material;

means for producing a gate full open signal representing the extent of displacement of the gate away from said closed position to the gate full open position;

and means including a pinch position circuit rendered operative in response to the load of material in the basket approaching said final volume for moving the gate from said gate full open position to a pinch position to slow said delivery;

means operative in response to the load reaching the final volume for moving the gate from the pinch position to the closed position;

said pinch position circuit being responsive to said gate full open signal for determining the extent the gate is open in said pinch position.

9. Centrifugal apparatus according to claim 8, said control means including means for producing a load signal varying in magnitude according to variations of the thickness of a wall of charge material being formed in the basket during said delivery, said means for moving the gate to a pinch position being operative in response to said load signal.

10. Centrifugal apparatus according to claim 9, said load signal diminishing in magnitude with increase of said wall thickness, said control means including means responsive to absence of said load signal to cause closing of said loading gate.

11. Centrifugal apparatus according to claim 9, further including means for moving said loading gate to closed position when said load signal indicates a thickness of said wall of charge material substantially corresponding to said final volume.

* * * * *

UNITED STATES PATENT AND TRADEMARK OFFICE

CERTIFICATE OF CORRECTION

PATENT NO. : 5,254,241
DATED : October 19, 1993
INVENTOR(S) : Joseph B. Bange, et al.

It is certified that error appears in the above-identified patent and that said Letters Patent is hereby corrected as shown below:

IN THE DRAWINGS:

In FIG. 3, replace "PL" with --P1-- and replace "Gfo" with --GFO--.

In col. 9 at line 25, replace "is indicating" with --has indicated--.

Signed and Sealed this

Seventh Day of June, 1994

*Attest:*

BRUCE LEHMAN

*Attesting Officer* *Commissioner of Patents and Trademarks*